United States Patent
Kaikkonen et al.

(10) Patent No.: US 10,004,012 B2
(45) Date of Patent: Jun. 19, 2018

(54) SPECIAL HANDLING OF LOW PRIORITY CELLS

(71) Applicant: Nokia Technologies Oy, Espoo (FI)

(72) Inventors: Jorma Johannes Kaikkonen, Oulu (FI); Sari Kaarina Nielsen, Espoo (FI); Jarkko Koskela, Oulu (FI); Lars Dalsgaard, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 5 days.

(21) Appl. No.: 15/113,553

(22) PCT Filed: Feb. 12, 2015

(86) PCT No.: PCT/US2015/015589
§ 371 (c)(1),
(2) Date: Jul. 22, 2016

(87) PCT Pub. No.: WO2015/123405
PCT Pub. Date: Aug. 20, 2015

(65) Prior Publication Data
US 2017/0006510 A1  Jan. 5, 2017

Related U.S. Application Data

(60) Provisional application No. 61/939,049, filed on Feb. 12, 2014.

(51) Int. Cl.
*H04L 12/28* (2006.01)
*H04W 36/00* (2009.01)
(Continued)

(52) U.S. Cl.
CPC ........ *H04W 36/0094* (2013.01); *H04H 20/38* (2013.01); *H04W 36/0088* (2013.01);
(Continued)

(58) Field of Classification Search
None
See application file for complete search history.

(56) References Cited

U.S. PATENT DOCUMENTS 8,593,990 B1 * 11/2013 Henttonen ........ H04W 36/0094
370/252
8,634,836 B2 * 1/2014 Pani ...................... H04W 24/10
370/331
(Continued)

FOREIGN PATENT DOCUMENTS

| EP | 2448322 | 5/2012 |
| EP | 2555448 | 2/2013 |
| WO | 20110416062 | 4/2011 |

OTHER PUBLICATIONS

International Search Report and Written Opinion received for corresponding Patent Cooperation Treaty Application No. PCT/US2015/015589, dated Jul. 29, 2015, 18 pages.

*Primary Examiner* — Michael J Moore, Jr.
(74) *Attorney, Agent, or Firm* — Squire Patton Boggs (US) LLP

(57) ABSTRACT

Methods and apparatus, including computer program products, are provided low priority cells. In one aspect there is provided a method, which may include performing, by a user equipment, monitoring of at least a second carrier during times not associated with measurement gaps, when the second carrier is designated as a low priority carrier.

20 Claims, 6 Drawing Sheets

(51) Int. Cl.
    *H04W 48/16*     (2009.01)
    *H04H 20/38*     (2008.01)
    *H04W 40/00*     (2009.01)
    H04W 24/10     (2009.01)
    H04W 76/04     (2009.01)

(52) U.S. Cl.
    CPC ......... *H04W 40/005* (2013.01); *H04W 48/16* (2013.01); *H04W 24/10* (2013.01); *H04W 36/0061* (2013.01); *H04W 76/048* (2013.01); *H04W 76/28* (2018.02)

(56) References Cited

U.S. PATENT DOCUMENTS

| | | | |
|---|---|---|---|
| 9,763,151 B2* | 9/2017 | Kim ...................... | H04W 36/04 |
| 2012/0178465 A1 | 7/2012 | Lin et al. | |
| 2013/0016690 A1* | 1/2013 | Jeong ................... | H04W 24/10 |
| | | | 370/329 |
| 2013/0188499 A1* | 7/2013 | Mach ................... | H04W 48/20 |
| | | | 370/252 |
| 2013/0210443 A1* | 8/2013 | Pedersen ........... | H04W 36/0061 |
| | | | 455/441 |
| 2014/0146794 A1* | 5/2014 | Dalsgaard ............... | H04W 8/02 |
| | | | 370/332 |
| 2014/0162650 A1* | 6/2014 | Islam ................ | H04W 36/0083 |
| | | | 455/436 |
| 2015/0312775 A1* | 10/2015 | Yi ........................ | H04W 16/00 |
| | | | 370/254 |
| 2016/0212595 A1* | 7/2016 | Fukuta ................ | H04W 76/002 |
| 2016/0330641 A1* | 11/2016 | Zhang ................... | H04W 24/02 |
| 2017/0265099 A1* | 9/2017 | Pani ...................... | H04W 24/10 |

\* cited by examiner

SPECIAL HANDLING OF LOW PRIORITY CELLS

RELATED APPLICATION

This application was originally filed as PCT Application No. PCT/US2015/015589 filed Feb. 12, 2015 which claims priority benefit from U.S. Provisional Application No. 61/939,049, filed Feb. 12, 2014.

FIELD

The subject matter described herein relates to wireless devices.

BACKGROUND

Some specifications, such as the 3rd Generation Partnership Project (3GPP), Technical Specification (TS) Group Radio Access Network, Evolved Universal Terrestrial Radio Access (E-UTRA), Requirements for support of radio resource management (Release 12), 2013-12 (hereinafter 3GPP TS 36.133) and 3GPP TS Group Radio Access Network, Requirements for support of radio resource management (FDD), (Release 12), 2013-12 (hereinafter 3GPP TS 25.133), may define how many different carriers for intra-frequency, inter-frequency, and inter-radio access technology (RAT) neighbor cell searches and level measurements a given user equipment may need to be able to monitor.

Connected mode discontinuous receive (DRX) refers to a user equipment monitoring a physical downlink control channel (PDCCH) in a discontinuous manner according to rules and parameters defined in for example 3GPP, TS Group Radio Access Network, E-UTRA, Medium Access Control (MAC) protocol specification, (Release 12, hereinafter TS 36.321). When the user equipment in DRX is not required to monitor the PDCCH, the user equipment in DRX may turn off (for example, make inactive) its receiver hardware to reduce receiver power consumption.

SUMMARY

Methods and apparatus, including computer program products, are provided low priority cells.

In some example embodiments, there may be provided a method, which may include performing, by a user equipment, monitoring of at least a first carrier during at least one measurement gap, when the first carrier is designated as a high priority carrier; and performing, by the user equipment, monitoring of at least a second carrier during at least one time not associated with the at least one measurement gap, when the second carrier is designated as a low priority carrier.

In some variations, one or more of the features disclosed herein including the following features can optionally be included in any feasible combination. The user equipment may receive measurement configuration information for a plurality of carriers including the first carrier and the second carrier. The measurement configuration information may include an indication that the first carrier is a high priority carrier. The measurement configuration information may include an indication that the second carrier is a low priority carrier. The at least one measurement gap may occur during an active transmission comprising at least one gap assisted measurement. During the at least one measurement gap the user equipment may be inhibited from monitoring low priority carriers and allowed to monitor high priority carriers. The at least one time not associated with the at least one measurement gap may include an inactive period including an idle mode during which the user equipment measures at least the low priority carrier. The at least one time not associated with the at least one measurement gap may include an inactive period including a discontinuous receive mode during which the user equipment measures at least the low priority carrier.

Moreover, in some example embodiments, there may be provided a method which may include receiving, at a user equipment in an idle mode, a measurement configuration sent via a system information block, the measurement configuration for at least one carrier in excess of three carriers; and handling, by the user equipment, one or more measurements of the at least one carrier in excess of three carriers with relaxed performance requirements.

In some variations, one or more of the features disclosed herein including the following features can optionally be included in any feasible combination. The measurement configuration may be received via at least one of a broadcast or signaling from a base station. The system information block may include system information block 5. The handling may include performing measurements of the at least one carrier in excess of three carriers using best efforts to scan and/or measure the at least one carrier. The handling may include performing measurements of the at least one carrier by at least one of using best efforts to measure the at least one carrier, ignoring the at least one carrier, scanning, or measuring the at least one carrier.

Furthermore, in some example embodiments, there may be provided a method which may include receiving, at a user equipment in a connected radio resource control mode, a measurement configuration sent in response to providing a network a capability indication regarding monitoring at least one carrier in excess of three carriers; and performing, by the user equipment, monitoring of the at least one carrier in excess of three carriers, wherein the at least one carrier in excess of three carriers may be monitored at a lower priority when compared to the three carriers.

In some variations, one or more of the features disclosed herein including the following features can optionally be included in any feasible combination. The user equipment may provide capability information to the network, wherein the capability information indicates whether the user equipment supports carrier measurements in excess of three carriers. The measurement configuration may be received via at least one of a broadcast or signaling from a base station.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
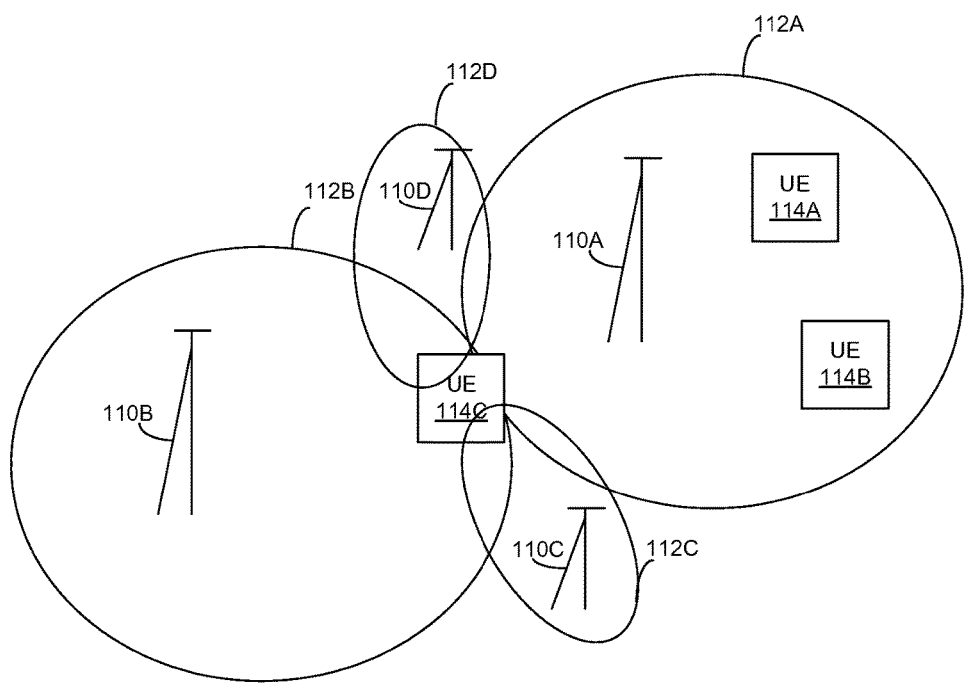
FIG. 1 depicts an example of a system, in accordance with some example embodiments.

Like labels are used to refer to same or similar items in the drawings.

DETAILED DESCRIPTION

Wireless network operators face increasingly complex deployments including complex and increasing numbers of access network layers. In 3GPP, the quantity of intra-radio access technology (RAT) and inter-RAT carriers being monitored by a given user equipment may increase in order to accommodate this increased complexity. When the amount of carriers that the user equipment monitors is increased, several issues may, however, need to be considered. For example, user equipment mobility may need to be configured in order to provide smooth running service with a minimal amount of failures due to for example handover failures and the like. When the quantity of user equipment monitored carriers is increased, this may directly impact the amount of measurements (for example, cell detections, mobility measurements, and level measurements, such as reference signal received power and the like) that a given user equipment performs. Specifically, the user equipment may have a limited time to perform these measurements. For a user equipment in a connected mode having active transmissions and configured for measurement gaps to perform measurements, the time available to the user equipment for measurements is limited and directly dictated by measurement gaps. Measurement gaps refer to gaps during which a user equipment (for example, a single receiver user equipment) stops active transmission in order to tune to and monitor cells on other frequencies and/or other radio access technologies. Examples of measurement gaps are described in 3GPP TS 36.133. Increasing the amount of carriers may, however, require the user equipment to perform more measurements during the limited time window provided by one or more measurement gaps. This may lead to a decrease in measurement accuracy, longer cell detection time, as well as an increase in user equipment reporting delay that may lead to reduced mobility robustness and the like.

In some example embodiments, the subject matter disclosed herein may monitor high priority carriers and/or radio access technologies during the measurement gaps, such as those measurement gaps specified in 3GPP TS 36.133 and other standards. However, some carriers and/or radio access technologies may be handled with a lower priority, so any measurements of the lower priority carriers and/or radio access technologies may be performed during non-measurement gap periods, such as when the user equipment is in a connected mode DRX (for example, during inactive times) or in an IDLE mode. As such, the user equipment may be able to perform lower priority monitoring of carriers and/or radio access technologies, while not substantially impacting higher priority monitoring carriers and/or radio access technologies performed during the measurement gaps.

Before providing additional examples regarding the multiple carrier and/or radio access monitoring, the following provides a description of a system, in accordance with some example embodiments.

FIG. 1 depicts a system 100 including a plurality of wireless access points 110A-D serving cells 112A-D, in which user equipment 114A-C are located, in accordance with some example embodiments. For example, wireless access points 110A-B may be implemented as macro, evolved Node B base stations, while wireless access points 110C-D may be implemented to serve small cells using for example the same or different radio access technology. Although FIG. 1 depicts a certain quantity, type, and configuration of devices, other quantities, types, and configurations may be implemented as well. For example, other quantities and configurations of wireless access points, base stations, cells, and user equipment may be implemented as well.

In some example embodiments, user equipment 114A-C may be implemented as a mobile device and/or a stationary device. The user equipment 114A-C may be referred to as, for example, mobile stations, mobile units, subscriber stations, wireless terminals, tablets, smart phones, wireless devices, devices, or the like. A user equipment may be implemented as, for example, a wireless handheld device, a wireless plug-in accessory, or the like. In some example embodiments, user equipment 114A-C may be implemented as multi-mode user devices configured to operate using a plurality of radio access technologies, although a single-mode device may be used as well. For example, user equipment 114A-C may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), near field communications (NFC), and any other radio access technologies.

Moreover, user equipment 114A-C may monitor other carriers/radio access technologies in order to determine handover and offloading opportunities and the like. For example, user equipment 114C may monitor cells 112A-D by performing measurements on the carrier frequencies associated with wireless access points 110A-D (which may be implemented using the same or different radio access technologies). Furthermore, the user equipment may use a single receiver to make measurements, as noted, during measurement gaps. Specifically, the user equipment may, in some example embodiments, monitor certain high priority carriers and/or radio access technologies during the measurement gaps, but measurements associated with lower priority carriers and/or radio access technologies may be performed during non-measurement gap periods, such as when the user equipment is in a connected mode DRX (during which active transmission is not taking place) and/or in an IDLE mode. In the example of FIG. 1, user equipment 114C may measure high priority carriers from for example wireless access points 110A and/or B during measurement gaps, but measure a low priority carrier, such as wireless access point 110C at times other than during the measurement gaps, although this is merely an example as other carriers may be treated as high or low priority carriers.

Wireless access points 110A-D may, in some example embodiments, be implemented as an evolved Node B (eNB) type base station, although other types of radio access points may be implemented as well. Wireless access points 110A-D may also be configured to serve cells using a WLAN technology, such as WiFi (for example, the IEEE 802.11 series of standards), as well as any other radio access technology capable of serving a cell. When the evolved Node B (eNB) type base station is used, the base station may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). Wireless access points 110A-D may have wired and/or wireless backhaul links to other networks and/or network nodes including a core network, a network management entity, and the like.

Figure 2:
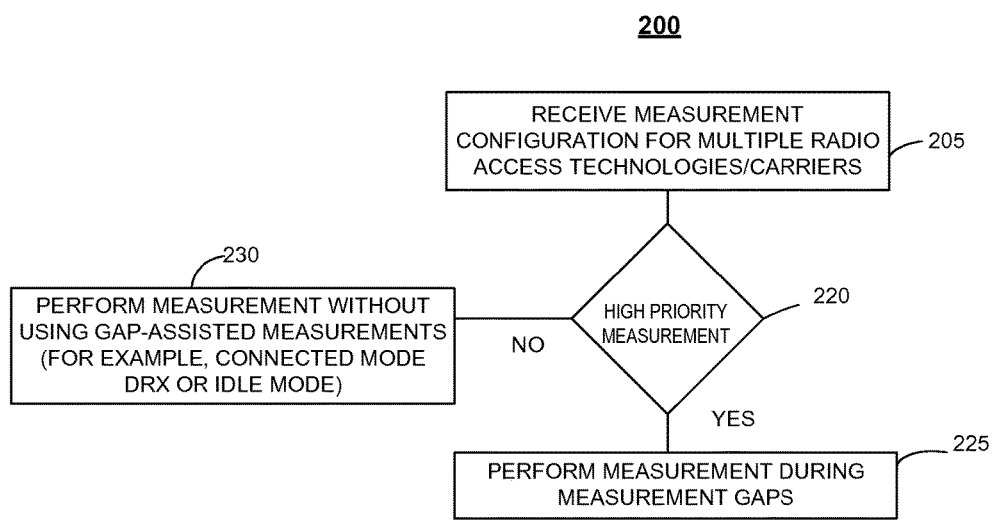
FIG. 2 depicts an example of a process for special handling of lower priority carriers, in accordance with some example embodiments.

In some example embodiments in which multiple carriers and/or RATs may be defined for measurements purposes, the carriers/RATs may be categorized into at least two different categories, such as a high priority and a low priority, although other categories and/or priority schemes may be used as well. Based on the category (and thus priority), the user equipment may perform measurements differently as noted. For example, measurements targeted for the carriers/RATs indicated as having high priority may be performed during measurement gaps when measurement gaps are needed/used (or with an additional radio receiver branch at the user equipment if present). However, for other measurements, for carriers/RATs that are indicated as having a low priority (which may be indicated as so-called additional or new neighbor carriers/RATs), these lower priority cell measurements may be performed when the user equipment has entered into a connected mode DRX (during the inactive transmission time of DRX), an IDLE mode, and/or any other non-measurement gap period. Although some of the examples described herein refer to two categories, other quantities of categories may be used as well FIG. 2 depicts an example process 200 for monitoring, in accordance with some example embodiments. The description of process 200 also refers to FIG. 1.

At 205, a user equipment may receive measurement configuration information for a plurality of carriers/radio access technologies, in accordance with some example embodiments. For example, user equipment 114C may receive from the network (for example, a base station via signaling or a broadcast) measurement configuration information instructing/indicating to user equipment 114C that it may monitor the carriers/RATs of neighboring cells including wireless access points 110A-D. Moreover, this configuration may indicate that some of the carriers are high priority carriers to be measured during the measurement gaps, while low priority carriers may be measured at times other than the measurement gaps. To illustrate with an example, the configuration information may indicate that carriers for wireless access point 110A-C may be monitored as high priority carriers, while the carrier from wireless access point 110D may be monitored as a low priority carrier.

Although 205 describes the measurement configuration being provided by the network, the user equipment may receive the measurement configuration information in other ways (for example, specified in a standard and the like). In addition, the indication of the priority order of the carriers/frequency may be provided in a variety of ways including for example using IDLE mode priorities, extending a measurement object to indicate whether a carrier frequency is a high priority or a low priority, and the like.

If a carrier/radio access technology is a high priority carrier, user equipment 114C may monitor the high priority carrier during the measurement gaps, in accordance with some example embodiments (yes at 220 and 225). Referring to the previous example, user equipment 114C may monitor carriers from wireless access points 110A-C during measurement gaps. For example, user equipment 114C may cease active transmission during a measurement gap and tune to another carrier frequency to measure one or more of carriers from wireless access points 110A-C. When the user equipment is applying gap-assisted measurements during active time (for example, not applying DRX or not in IDLE mode), the user equipment may be configured to only measure higher priority carriers, in some example embodiments.

If a carrier/radio access technology is a low priority carrier, user equipment 114C may monitor the low priority carrier at times other than the measurement gaps, in accordance with some example embodiments (no at 220 and 230). Referring to the previous example, user equipment 114C may monitor the carrier from wireless access points 110D during times other than the measurement gaps. For example, user equipment 114C may, during an IDLE mode or a DRX connected mode (for example, during an inactive transmission time of the DRX when the DRX inactivity timer expires) monitor wireless access point 110D. Moreover, this low priority monitoring may be considered as best efforts in the sense that user equipment 114C may perform the low priority carrier monitoring when it can.

In some example embodiments, high priority measurements (targeted to higher priority layers) may be those types of measurements that are important to basic mobility performance and a network's key performance indicators, while the lower priority measurements may be targeted to for example offloading layers and the like.

In some example embodiments, user equipment 114C may not enable lower priority measurements at 230 on carrier(s)/RATs until user equipment 114C enters into for example a DRX and/or the IDLE mode is activated. When this is the case, user equipment 114C may then schedule additional measurements during non-gap related time periods according to the applied requirements. These requirements to perform the measurements may be the same or similar (save the non-gap measurement times) as the higher priority measurements.

If a user equipment is not able to measure at 230 the low priority carrier(s)/RAT(s) within a certain time, the user equipment may, in some example embodiments, decide to use some of the measurement gap time. For example, if user equipment 114C has not had a DRX idle period for a certain time (for example, 10 seconds), the user equipment 114C may allocate a portion of the measurement gap for the lower priority carrier(s)/RAT(s) monitoring. But even in this example, the user equipment's use of the measurement gap may be minimized to a relatively rare occasion.

Although low priority carriers/RATs may be measured during non-gap measurement periods, higher priority carriers may be monitored/measured during measurement gaps and at any other times as well including for example during the inactive periods of DRX and IDLE mode.

In some example embodiments, user equipment cell identification and measurement requirements for low priority (or for example additional/new neighbor) carriers/RATs may also be defined to be more relaxed than the ones of the existing or higher priority neighbor carriers and RATs even in connected mode DRX or IDLE mode operations. This may enable minimizing the impacts on neighbor cell identification and measurements for the existing or higher priority neighbor carriers and RATs even in connected mode DRX and idle mode. In some example embodiments, this may cause the user equipment to take a longer amount of time to identify and measure a cell on lower priority carrier or RAT than to identify and measure a cell on the existing or higher priority carrier or RAT with the same DRX cycle and other assumptions.

In addition to the limitation of doing the lower priority (or additional new neighbor) carrier/RAT measurements at times other than the measurement gap time window (for example, as part of inactive portion of DRX after a drx-InactivityTimer has expired), the measurements may, in some example embodiments, be further categorized according to a DRX operation. For example, a lower priority carrier/RAT measurements may be performed in accordance with one or more of the following:

- Lower priority measurement performed only when DRX is operated according to 'shortDRX-Cycle';
- Lower priority measurement performed only when DRX is operated according to 'longDRX-Cycle';
- Lower priority measurement performed when some time has passed since the DRX has started (e.g., additional timer for staring the measurements to increase the likelihood that user equipment will stay in DRX);
- Lower priority measurement performed when an applied DRX cycle is exceeding a certain threshold (which may be used also to split into different lower priority classes); and/or
- Lower priority measurement performed on one lower priority carrier once per on-duration/DRX cycle.

In some example embodiments, the network may also provide sufficient measurement time to the user equipment for the monitoring/measurements disclosed herein.

The following example embodiments relate to relaxed performance requirements that may be imposed on a user equipment when there is an increase in the quantity of carriers that a user equipment may need to monitor. Specifically, in some example embodiments, when the network configures a user equipment to monitor/measure more than 3 carriers, the user equipment may treat carriers beyond the 3 carriers as lower priority carriers on which relaxed requirements may be applied.

The network may indicate to a user equipment which carriers (or RATs) may be measured with a low priority and/or with relaxed requirements to enable a longer measurement period to complete the measurement or to enable a longer cell detection time. To illustrate, a user equipment having relaxed requirements may not need to attempt identification (and/or search) and measurement of cells on lower priority carriers and RATs as frequently as identification and measurement is performed for higher priority carriers and RATs. Thus, relaxed requirements may relax the minimum time requirement (for example, by allowing more time) for a user equipment to identify a new cell on a lower priority carrier than the corresponding requirement for a higher priority (or existing carrier/RAT); and/or the relaxed requirements may allow more time for performing level measurements (for example, RSRP and RSRQ measurements) on lower priority carriers and RATs when compared to a higher priority or existing carrier/RAT. For example, when the network configures (or broadcasts to) information at a user equipment to enable monitoring of more than 3 carriers, any carriers beyond 3 carriers may be designated as lower priority carriers on which relaxed performance requirements may apply. Some user equipment, such as legacy user equipment, may only be able to handle monitoring 3 carriers, while other user equipment may be able to handle carriers in excess of 3. In the case of any carriers in excess 3 carriers, the user equipment may only be required to perform cell search and measurement according to relaxed requirements, such best efforts or as lower priority monitoring (for example, using non-measurement periods as noted above). To illustrate further, existing user equipment requirements defined in for example TS 36.133 may be applied if not more than 3 neighbor carriers are indicated to the user equipment, but if more than 3 carriers are indicated, another set of user equipment requirements may be used, so for example TS 36.133 may be extended to define the additional set of requirements. This additional set of relaxed requirements may most likely be defined so that more time is allowed for the user equipment to identify and measure cells on lower priority carriers(s) or carriers for which relaxed requirements are applied. This approach may ensure that the user equipment may not need to use limited measurement gaps for performing inter-frequency/RAT measurements. Moreover, a user equipment with 2 or more receivers may be able to identify the carriers in excess of 3 via application of relaxed requirements for cell search and measurement as well, and thereby benefit from lower priority/relaxed performance in terms of reduced power consumption for measurements. To illustrate, the relaxed requirements may impose best efforts for the measurements including measurements during idle periods (for example, during idle/inactive portions of DRX or during an IDLE mode). However, in the case of IDLE mode measurements (for example, measurements performed on the carriers/RATs in excess of 3), the network may not be able to configure additional measurements objects (for carrier frequencies) than what is already specified in the requirements for legacy user equipment (for example, user equipment in 3GPP REL8), so if the network adds more carrier frequency measurement objects, the network may not know which carrier frequencies the user equipment can actually measure. In the case of connected mode measurements, the network may need to get knowledge of which user equipment support of the carrier monitoring in excess of 3 features in order to know to which user equipment can be signaled to perform the increased amount of measurements objects.

In the case of IDLE mode measurements, the network may, as noted, not be able to configure additional measurements objects for carrier frequencies than what is required in certain legacy releases of 3GPP (for example, 3GPP Release 8) because if more objects are configured the network may not know which carrier frequencies at a given user equipment can be measured. However, the network may signal additional measurement frequencies in for example a newly defined system information block (SIB) or as an information element extending an existing inter-frequency SIB, such as SIB5 and the like. In this way, a legacy user equipment (which may not be able to support measurements/monitoring of more than 3 carriers) may ignore the carrier frequencies in excess of 3 without impacting operation of the legacy user equipment. However, a user equipment supporting carriers/RATs in excess of 3 may handle the additional carrier frequency information (for example, extra neighbor carriers with performance requirements as defined by the system). Additionally, similar changes may be done in other RATs when considering reselection to EUTRAN with more frequencies than what is required in legacy 3GPP Release 8. Although some of the examples refer to 3 carriers and an excess of three carriers, other quantities of carriers may be used as well.

In the case of connected mode, the network may need knowledge regarding the user equipment's support of carrier monitoring in excess of 3 feature in order to know which user equipment can handle an increased amount of carrier frequency measurements objects (and thus can be signaled to perform the monitoring in excess of 3). The network may have information regarding which user equipment support measurement of more carrier frequencies than legacy Release 8 requirements (which limit the monitoring to 3) via separate capability/feature group indicators signaling or a specific user equipment release indication.

Figure 3A:
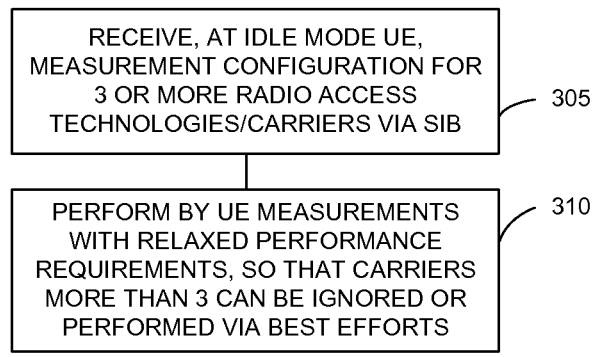
FIGS. 3A-3B depict examples of processes for relaxed performance requirements for lower priority carriers, in accordance with some example embodiments.

FIG. 3A depicts an example of a process 300 for implementing relaxed measurement requirements, in accordance with some example embodiments. The description of FIG. 3A also refers to FIG. 1.

At 305, a user equipment may receive a measurement configuration for excess of three carrier/radio access technologies, in accordance with some example embodiments. For example, user equipment 114C may be in an IDLE mode, and may receive measurement configuration information (which may be signaled, broadcast, and/or provided in any other way as well as specified) indicating measurements of carriers/RATs for access points 110A-D. If the user equipment 114C is in an IDLE mode, the network (via for example, one of the wireless access points) may signal the carrier frequency in excess of 3 (which is not supported by some of the user equipment) for measurement via a newly defined system information block (SIB) and/or as an information element extending an existing inter-frequency SIB, such as SIB5 and the like. For example, the carrier frequency for wireless access point 110D may be signaled via the newly defined system information block (SIB) and/or as an extension to an information element in SIB5.

At 310, a user equipment may perform a measurement on the carrier frequencies in excess of three using relaxed performance requirements, in accordance with some example embodiments. For example, user equipment 114C may use best efforts to scan and/or measure the carrier frequency for wireless access point 110D signaled at 305, if user equipment 114C can handle the additional measurement. However, if user equipment 114C is a legacy device, user equipment 114C may choose to ignore, use best efforts, and/or scan and/or measure the carrier frequency in excess of three (which in this example is associated with wireless access point 110D) with low priority.

Figure 3B:
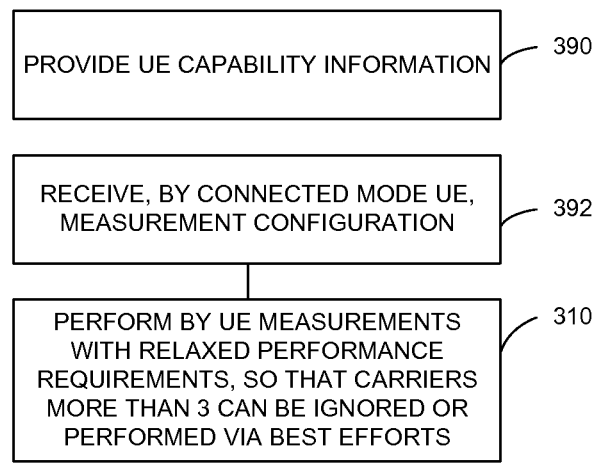

FIG. 3B depicts another example of a process 399 for implementing relaxed measurement requirements, in accordance with some example embodiments. The description of FIG. 3B also refers to FIG. 1.

At 390, user equipment capability information may be provided to the network, in accordance with some example embodiments. For example, the user equipment may indicate to the network whether the user equipment supports increased carrier frequencies measurements. This may be performed via separate capability/feature group indicators signaling or indicated by for example a specific user equipment release indication. In any case, this may allow the network to know whether the user equipment supports measurements of more than 3 carriers/RATs.

At 392, a user equipment in a radio resource control (RRC) connected mode may receive, in response to 390, a measurement configuration for the excess of three radio access technologies, in accordance with some example embodiments. When this is the case, the user equipment may perform the measurements for the excess carriers/RATs with relaxed requirements at 310. For example, using RRC Connected mode as an example, additional carriers (beyond the for example 3 carriers supported in legacy user equipment) may be signaled either as a new SIB, a new Information Element (IE) or similar. A legacy user equipment may not understand this new signaling but a newer release user equipment configured for more than 3 carrier measurement/monitor would. The new user equipment (which supports an extended amount of carriers to be monitored) may decode the new information. These new carriers in excess of 3 may then per default be understood as carriers on which the user equipment is only required to perform cell search and measurements using relaxed performance requirements. Alternatively or additionally, the new carriers in excess of 3 may be treated as low priority carriers on which relaxed requirements may be applied. Alternatively or additionally, there may be a mix in which it is indicated which carriers are low priority or on which carriers relaxed requirements apply.

Figure 4:
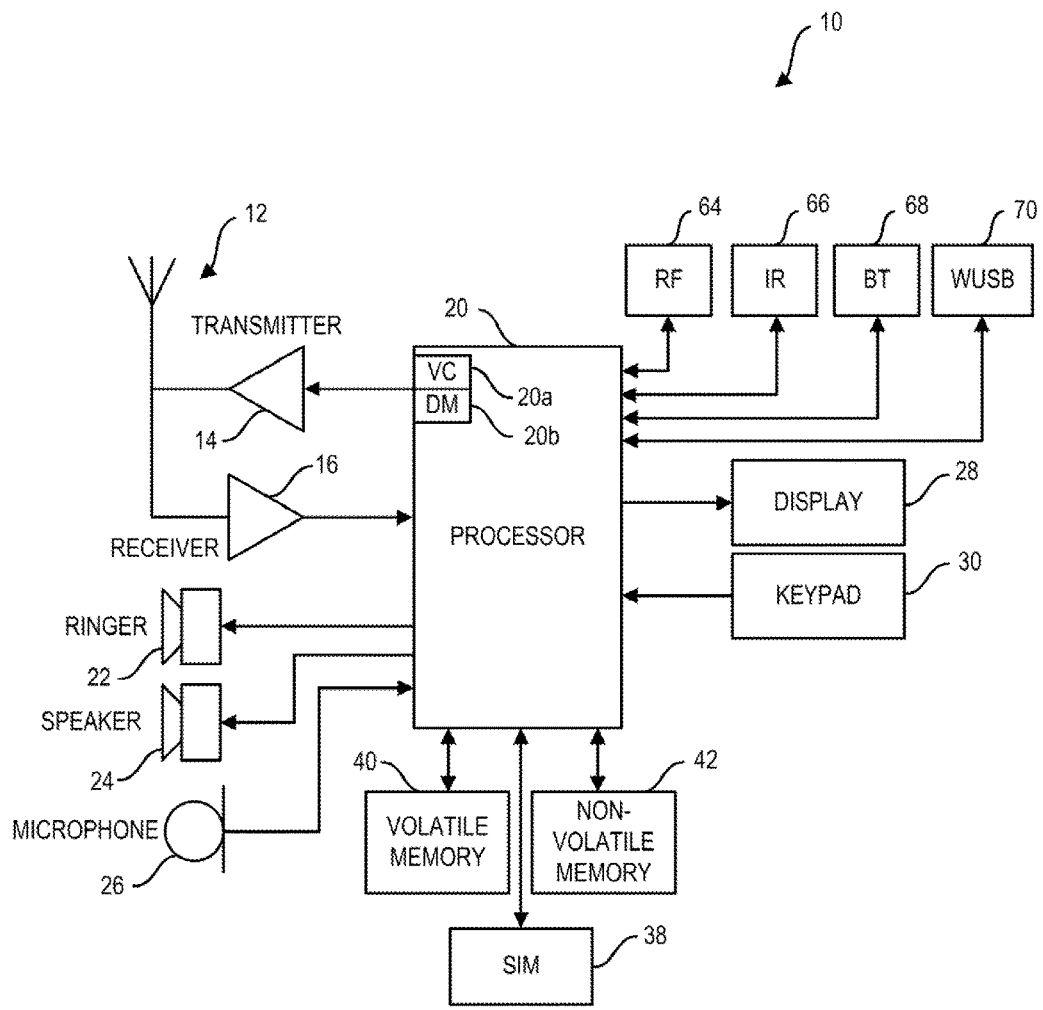
FIG. 4 depicts an example of a user equipment, in accordance with some example embodiments.

FIG. 4 illustrates a block diagram of an apparatus 10, in accordance with some example embodiments. For example, apparatus 10 may comprise a user equipment, such as a smart phone, a smart object, a mobile station, a mobile unit, a subscriber station, a wireless terminal, a tablet, a wireless plug-in accessory, a wireless sensor, a headset, or any other wireless device. The apparatus 10 may correspond to for example the Bluetooth™ device having the touch screen sensor and/or a Bluetooth™ device being detected by the touch screen sensor.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G)

communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as an international mobile equipment identification (IMEI) code, capable of uniquely identifying apparatus 10. The functions may include one or more of the user equipment operations disclosed with respect to process 200, 300, and/or 399 and the like. The memories may comprise an identifier, such as an international mobile equipment identification (IMEI) code, capable of uniquely identifying apparatus 10. In the example embodiment, the processor 20 may be configured using computer code stored at memory 40 and/or 42 to perform UE operations as disclosed herein including process 200, 300, and/or 399.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

Figure 5:
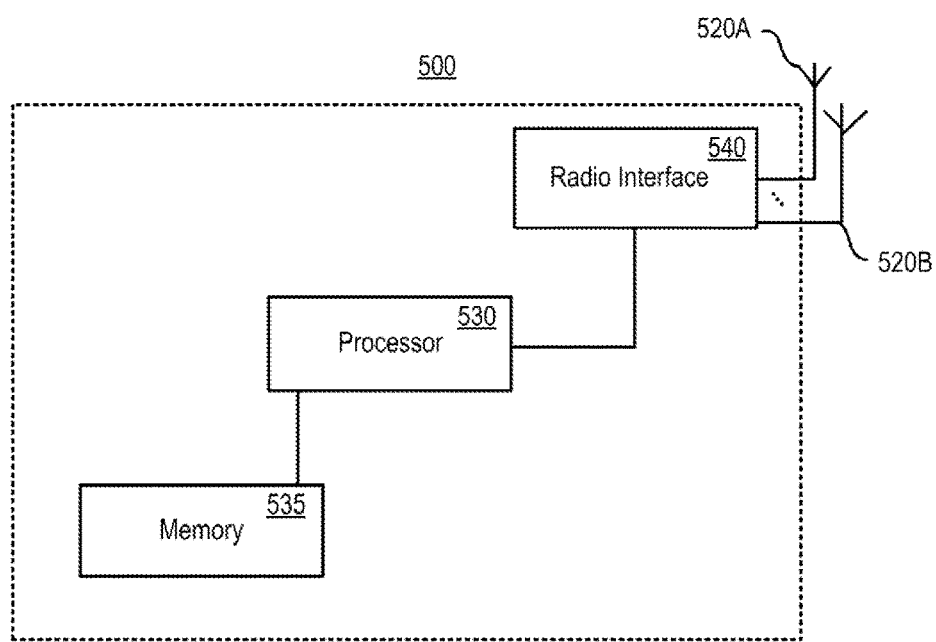
FIG. 5 depicts an example of a wireless access point, in accordance with some example embodiments.

FIG. 5 depicts an example implementation of a wireless access point 500, which may be implemented at for example wireless access points 110A-D, in accordance with some example embodiments. The wireless access point may include one or more antennas 520 configured to transmit via downlinks and configured to receive uplinks via the antenna(s) 520. The wireless access point may further include a plurality of radio interfaces 540 coupled to the antenna(s) 520. The radio interfaces 540 may correspond to a plurality of radio access technologies including one or more of LTE, WLAN, Bluetooth, Bluetooth low energy, NFC, radio frequency identifier (RFID), ultrawideband (UWB), ZigBee, ANT, and the like. The radio interface 540 may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). The wireless access point may further include one or more processors, such as processor 530, for controlling the wireless access point 500 and for accessing and executing program code stored in memory 535. In some example embodiments, the memory 535 includes code, which when executed by at least one processor, causes one or more of the operations described herein with respect to a network node, such as wireless access points 110A-D. For example, the wireless access point 500 may be configured perform wireless access point operations including send measurement configuration information for multiple carriers/RATs, receive measurements performed on low or high priority carriers, provide measurement configuration information for more than 3 carriers, and the like.

Without in any way limiting the scope, interpretation, or application of the claims appearing below, a technical effect of one or more of the example embodiments disclosed herein is enabling the network to configure additional lower priority measurements for a user equipment and obtain the measurement information, without substantially effecting the performance of the higher priority measurements. Without in any way limiting the scope, interpretation, or application of the claims appearing below, another technical effect of one or more of the example embodiments disclosed herein is enabling the network to support two features using the same/similar signaling and requirements.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least." The use of the phase "such as" means "such as for example" unless otherwise indicated.

What is claimed:

1. An apparatus, comprising:
   at least one processor; and
   at least one memory including computer program code,
   wherein the at least one memory and the computer program code are configured to, with the at least one processor, cause the apparatus to perform at least the following:
   transmit, to a user equipment, a measurement configuration for at least one low priority carrier in excess of three carriers, wherein at least one of the three carriers is a high priority carrier; and
   cause the user equipment to handle one or more low priority measurements of the at least one low priority carrier in excess of three carriers with relaxed performance requirements, wherein the relaxed performance requirements applied to the at least one low priority carrier allow more time for the user equipment to identify a new cell on the at least one low priority carrier than a corresponding requirement for the high priority carrier.

2. The apparatus of claim 1, wherein the user equipment is in an idle mode and the measurement configuration is transmitted via a system information block.

3. The apparatus of claim 2, wherein the system information block comprises system information block 5 and wherein the measurement configuration comprises an indication indicative of whether or not relaxed performance measurement is to be applied to the at least one carrier in excess of three carriers.

4. The apparatus of claim 1, wherein the user equipment is in a connected radio resource control mode and the measurement configuration is transmitted via a signaling in response to receiving a capability indication regarding monitoring from the user equipment.

5. A method comprising:
   receiving, at a user equipment in an idle mode, a measurement configuration sent via a system information block, wherein the measurement configuration for at least one low priority carrier in excess of three carriers, wherein at least one of the three carriers is a high priority carrier; and
   handling, by the user equipment, one or more low priority measurements of the at least one low priority carrier in excess of three carriers with relaxed performance requirements, wherein the relaxed performance requirements applied to the at least one low priority carrier allow more time for the user requirement to identify a new cell on the at least one low priority carrier than a corresponding requirement for the high priority carrier.

6. The method of claim 5, wherein the measurement configuration is received via at least one of a broadcast or signaling from a base station.

7. The method of claim 5, wherein the system information block comprises system information block 5 and wherein the measurement configuration comprises an indication indicative of whether or not relaxed performance measurement is to be applied to the at least one carrier in excess of three carriers.

8. The method of claim 5, wherein the handling comprises performing measurements of the at least one carrier in excess of three carriers using best efforts to scan or measure the at least one carrier.

9. The method of claim 5, wherein the handling comprises performing measurements of the at least one carrier by at least one of using best efforts to measure the at least one carrier, ignoring the at least one carrier, scanning, or measuring the at least one carrier.

10. A method comprising:
receiving, at a user equipment in a connected radio resource control mode, a measurement configuration sent in response to providing a network a capability indication regarding monitoring at least one low priority carrier in excess of three carriers, wherein at least one of the three carriers is a high priority carrier; and
performing, by the user equipment, monitoring of the at least one low priority carrier in excess of three carriers, wherein the at least one low priority carrier in excess of three carriers is monitored at a lower priority and with relaxed performance requirements when compared to the three high priority carriers,
wherein the relaxed performance requirements applied to the at least one low priority carrier allow more time for the user equipment to identify a new cell on the at least one low priority carrier than a corresponding requirement for the high priority carrier.

11. The method of claim 10, wherein the capability information indicates whether the user equipment supports carrier measurements in excess of three carriers.

12. The method of claim 10, wherein the measurement configuration is received via at least one of a broadcast or signaling from a base station.

13. An apparatus, comprising:
at least one processor; and
at least one memory including computer program code,
wherein the at least one memory and the computer program code are configured to, with the at least one processor, cause the apparatus to perform at least the following:
receive, at the apparatus in an idle mode, a measurement configuration sent via a system information block, wherein the measurement configuration for at least one low priority carrier in excess of three carriers, wherein at least one of the three carriers is a high priority carrier; and
handle, by the apparatus, one or more low priority measurements of the at least one low priority carrier in excess of three carriers with relaxed performance requirements, wherein the relaxed performance requirements applied to the at least one low priority carrier allow more time for the apparatus to identify a new cell on the at least one low priority carrier than a corresponding requirement for the high priority carrier.

14. The apparatus of claim 13, wherein the measurement configuration is received via at least one of a broadcast or signaling from a base station.

15. The apparatus of claim 13, wherein the system information block comprises system information block 5 and wherein the measurement configuration comprises an indication indicative of whether or not relaxed performance measurement is to be applied to the at least one carrier in excess of three carriers.

16. The apparatus of claim 13, wherein the handling comprises performing measurements of the at least one carrier in excess of three carriers using best efforts to scan or measure the at least one carrier.

17. The apparatus of claim 13, wherein the handling comprises performing measurements of the at least one carrier by at least one of using best efforts to measure the at least one carrier, ignoring the at least one carrier, scanning, or measuring the at least one carrier.

18. An apparatus, comprising:
at least one processor; and
at least one memory including computer program code,
wherein the at least one memory and the computer program code are configured to, with the at least one processor, cause the apparatus to perform at least the following
receive, at the apparatus in a connected radio resource control mode, a measurement configuration sent in response to providing a network a capability indication regarding monitoring at least one low priority carrier in excess of three carriers, wherein at least one of the three carriers is a high priority carrier; and
perform, by the apparatus, monitoring of the at least one low priority carrier in excess of three carriers, wherein the at least one low priority carrier in excess of three carriers is monitored at a lower priority and with relaxed performance requirements when compared to the three high priority carriers,
wherein the relaxed performance requirements applied to the at least one low priority carrier allow more time for the apparatus to identify a new cell on the at least one low priority carrier than a corresponding requirement for the high priority carrier.

19. The apparatus of claim 18, wherein the capability information indicates whether the apparatus supports carrier measurements in excess of three carriers.

20. The apparatus of claim 18, wherein the measurement configuration is received via at least one of a broadcast or signaling from a base station.

* * * * *